United States Patent
Nett et al.

[11] Patent Number: 6,117,016
[45] Date of Patent: Sep. 12, 2000

[54] TRANSMISSION COUPLING ASSEMBLY

[75] Inventors: Hans-Peter Nett, Adenau; Herbert Leonhart, Marktoberdorf; Robert Honzek, Oberthingau, all of Germany

[73] Assignee: AGCO GmbH & Co., Marktoberdorf, Germany

[21] Appl. No.: 09/010,909

[22] Filed: Jan. 22, 1998

[30] Foreign Application Priority Data

Jan. 25, 1997 [DE] Germany .......................... 197 02 682

[51] Int. Cl.[7] .................................................. F16D 3/52
[52] U.S. Cl. ............................................. 464/87; 464/179
[58] Field of Search ............................... 464/88, 87, 179, 464/7, 16

[56] References Cited

U.S. PATENT DOCUMENTS

| | | | |
|---|---|---|---|
| 3,141,354 | 7/1964 | Herndon et al. | 464/89 |
| 3,559,312 | 2/1971 | Fox et al. | 464/7 |
| 3,727,431 | 4/1973 | Yokel | 464/89 |
| 4,017,089 | 4/1977 | Kurata et al. | 277/634 |
| 4,516,956 | 5/1985 | Staiert | 464/87 |
| 4,781,654 | 11/1988 | Walter et al. | 464/89 |
| 5,168,774 | 12/1992 | Andra et al. | 464/89 |
| 5,219,273 | 6/1993 | Chang | 464/89 |
| 5,405,296 | 4/1995 | Cerny et al. | 464/89 |

FOREIGN PATENT DOCUMENTS

| | | | |
|---|---|---|---|
| 580443 | 1/1994 | European Pat. Off. | 464/92 |
| 651882 | 10/1937 | Germany | 464/89 |
| 3834919 A1 | 4/1990 | Germany . | |

*Primary Examiner*—Terry Lee Melius
*Assistant Examiner*—Greg Binda
*Attorney, Agent, or Firm*—MacMillan, Sobanski & Todd, LLC

[57] ABSTRACT

A transmission coupling assembly for absorbing axial and/or angular displacement between an internal combustion engine and a downstream gear train comprises a resilient vibration damper (3;24) secured to the flywheel (1;26). A coupling member (4;23) secured to the vibration damper is rotationally coupled to a coupling shaft (7;21) by means of interlocking splines, the splines (4a) of the coupling member being substantially straight and the splines (5a) of the coupling shaft being crowned or spherically curved. At the other end of the coupling shaft (7;21) a similar splined connection is made to the input shaft (8) of the downstream gear train. Lubrication is provided at the splined connection between the coupling shaft and the input shaft of the gear train, with a Z-cross section seal extending between the coupling shaft and the gearbox casing to prevent leakage of lubricant fluid.

15 Claims, 2 Drawing Sheets

TRANSMISSION COUPLING ASSEMBLY

BACKGROUND OF THE INVENTION

The invention relates to a transmission coupling assembly for absorbing axial and/or angular displacement between an internal combustion engine and a downstream gear train. The invention is particularly suited for use in utility vehicles or agricultural tractors having resiliently mounted engines.

In utility vehicles such as agricultural tractors, for example, which are built to a semi-chassis design, the drive motor, which is more often than not a diesel engine, may be resiliently mounted on a frame which is mounted by means of flanges on the gearbox housing. The drive motor and the gearbox housing are often spaced apart from one another to provide room for auxiliary drives (eg hydraulic pumps) which are mounted by means of flanges on the end face of the gearbox housing. Hydraulic pumps are required in say, a tractor, to supply hydraulic oil to the linkage lift mechanism and steering mechanism and for gear lubrication.

In order to compensate for relative axial and angular displacement between the engine output shaft and gear input shaft, the power is transmitted from the drive motor to the gearbox via an articulated shaft with longitudinal compensation, coupled with the engine output shaft and the gearbox input shaft by means of suitably sized flanges (see DE 38 34 919 A1). Because of the amount of space required for these flange mountings, the above-mentioned hydraulic pumps cannot be arranged as close to one another as their actual external dimensions would allow. Larger pump drive gears are needed in the gearbox in order to bridge the distance, which in turn means having to increase the width of the gearbox housing in an undesirable manner.

Hand in hand with the increased space requirement for the hydraulic pumps, the semi-chassis frame also needs to be made wider and this is undesirable since it places a restriction on the size of the steering lock angle of the steered front wheels.

SUMMARY OF THE INVENTION

The objective of the invention is to provide a transmission coupling assembly which will allow the hydraulic pumps to be arranged closer to the gear input shaft than has hitherto been possible in order to reduce the width dimensions of both the gearbox housing and the semi-chassis frame.

In a coupling assembly comprising a torsional vibration damper with a coupling shaft releasably secured thereto, the objective is achieved by the following features:

a) at one of the end regions thereof, the coupling shaft is rotationally coupled to the input shaft of the gearbox, by means of meshing crowned or curved or spherically curved splines, with an overlap between the coupling and input shafts of length L. The coupling shaft may be releasably axially fixed in this operating position, b) in the operating position, the end region of the coupling shaft on the engine side is centrally mounted by means of a rounded surface and c) a free space is arranged relative to the shaft at the end region thereof on the engine side such that, after its axial fixing has been released, it is able to slide out of its operating position at least across the distance L in the direction of the internal combustion engine.

Not only does a drive connection of this type allow a more compact construction of the tractor chassis, it is also significantly more cost effective because the expensive articulated shaft is used but is simple to manufacture and requires few other components. Above all, however, the transmission connection can be assembled and dismantled more quickly, without effort and without the risk of mis-assembly because a slot-in procedure with the shaft is essentially all that is needed for this purpose.

The simplest and fastest embodiment in terms of assembling and dismantling the transmission coupling is distinctive in that the fixed rotary coupling between a coupling member on the output side of the vibration damper and the coupling shaft is provided by means of splines, the coupling member being provided with straight splines and a boss of the shaft with curved splines.

To prevent the boss from being subjected to any radial deflection at higher drive speeds, the boss region of the coupling shaft may be mounted on the free, tapered end region of a spigot secured to the flywheel of the internal combustion engine which is received in a bearing region of the boss. The spigot is tapered or has a reduced diameter relative to the diameter of the bearing region over at least the length L.

Preferably, as a means of rotationally coupling the coupling member on the output side and the coupling shaft in an even more cost effective embodiment, a boss joined to the shaft and rotationally fast therewith is bolted to the coupling member on the side facing the internal combustion engine.

Preferably, in order to prevent the boss from being subjected to any radial displacement at higher drive speeds, an end or bearing region of the coupling shaft on the internal combustion engine side is of a rounded design and, in the operating position, is received in a bearing bush joined to the flywheel and the part of the shaft between the boss and the bearing region is of a minimum length L and is tapered or of reduced diameter relative to the diameter of the bearing region.

Preferably, lubricant fluid eg hydraulic oil is supplied to the coupling between the coupling shaft and gearbox input shaft. In this case, in order to ensure a reliable seal this region is closed off by means of a seal having a Z-shaped cross-section.

DESCRIPTION OF THE PREFERRED EMBODIMENT

Figure 1:
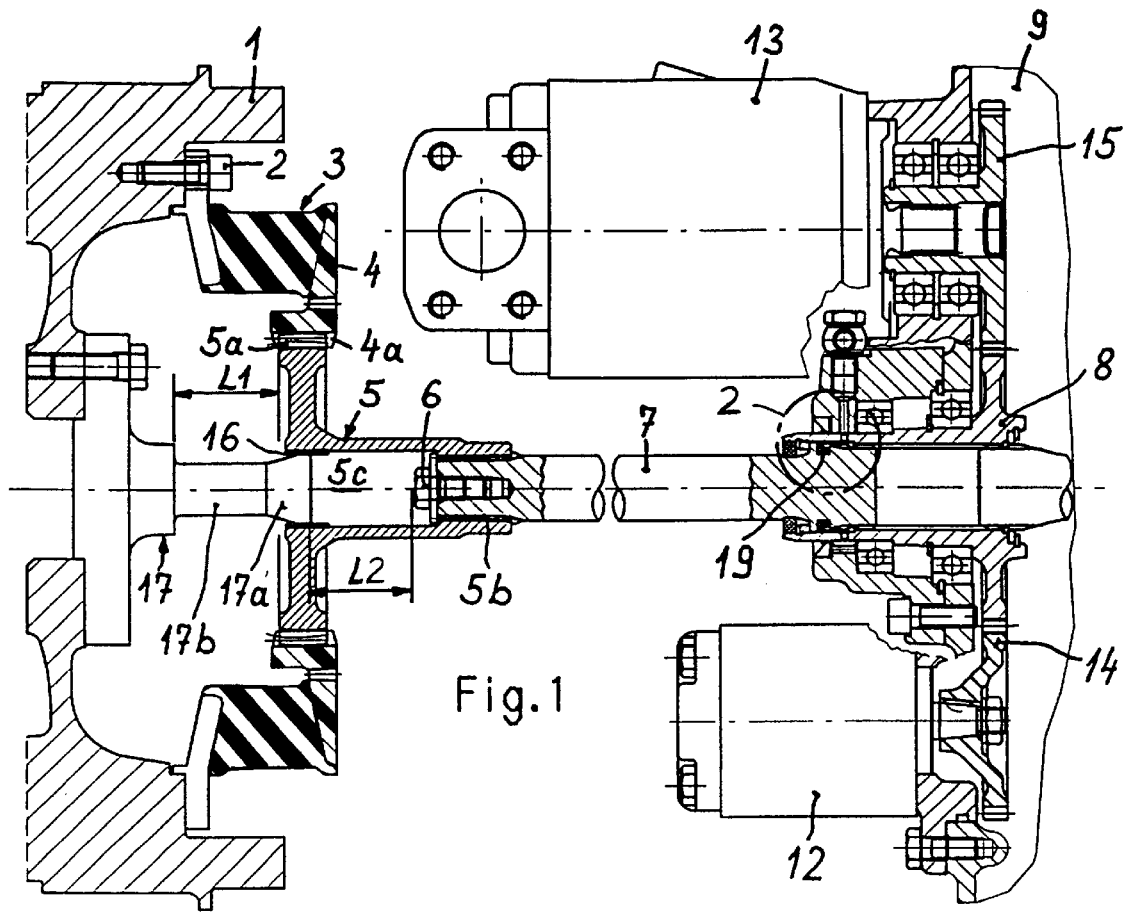
FIG. 1 is a side cross-sectional view of a first embodiment of the invention.

The first embodiment will now be described with reference to FIGS. 1 and 2. FIG. 1 illustrates only the flywheel 1 of the drive motor of a utility vehicle. Mounted on the flywheel 1 by means of bolts 2 is a torsional vibration damper 3, the coupling member 4 on the output side of which has internal splines 4a. Meshing with the internal splines are external, spherically curved splines 5a of a boss 5, which is rotationally fast to a coupling shaft 7 by means of splines 5b. A bolt 6 is also used to prevent bending. At the free end-region thereof remote from the flywheel 1, the coupling shaft 7 has external crowned or curved splines 7a, also spherical, which mesh with internal splines 8a of the input shaft 8 of a gearbox 9 such that the depth to which it penetrates the input shaft 8 is determined by the distance L. The coupling shaft 7 is axially fixed in this position relative to the input shaft 8 by means of a supporting ring 10 and retaining ring 11. Mounted on the gearbox housing at a slight distance away from the point at which the shaft 7 penetrates the gearbox 9 are two pumps 12, 13 which deliver the requisite hydraulic oil for the on-board hydraulic consumers, such as the steering mechanism or—in the case of agricultural tractors—the linkage lift mechanism. The pumps 12, 13 are driven by the input shaft 8 via gears 14 and 15.

In order to ensure the coupling shaft 7 is centrally guided under all operating conditions—a function which cannot be assumed by the relatively soft elastomeric material of the torsional vibration damper 3—the boss 5 is supported by means of a bearing ring 16 on a spigot 17 mounted on the flywheel 1. The spigot is of rounded section at the end lying in the bearing region, whilst the region 17a lying behind is of a tapered design, with cylindrical region 17b lying behind the tapered region and being smaller in diameter than the bearing region. The cylindrical region 17b, or the combination of the cylindrical region and the tapered region 17a, is of length L1> dimension L. The space surrounding the cylindrical region 17b is kept free of any other components. The boss bore 5c receiving the bearing ring 16 also has an effective depth L2> dimension L so that once the axial fixing is released, the coupling shaft 7 together with the boss 5 can be pushed towards the left in FIG. 1 by at least the distance L out of the operating position illustrated in FIG. 1. Since, in this case, the gearbox-side end of the coupling shaft 7 is removed completely from the input shaft 8 of the gearbox 9, the gearbox-side end region of the coupling shaft 7 can be swung away from the axis of the input shaft 8.

The boss 5 is then removed by sliding the splines 5a through the splines 4a of the coupling member 4. This is possible because of the spherically curved or crowned profile of the splines 5a of the boss 5. The transmission coupling can thus be quickly and rapidly dismantled in this manner or—in the reverse process—assembled.

By dint of the profile of the splines of the boss 5 and the coupling shaft 7, the transmission coupling assembly provides two articulated points whereby any axial or angular displacements are tolerated and any vibrations of the drive motor eg due to its resilient mountings are absorbed without these being passed on to the gear mechanism.

Figure 2:
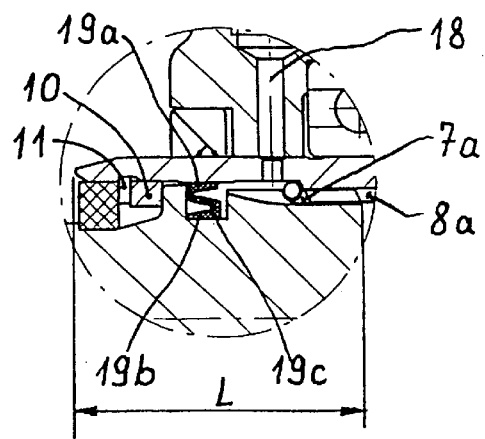
FIG. 2 shows the detail 2 of FIG. 1, on an enlarged scale.

In order to prevent any build-up of what is referred to as mating rust when using spline meshing mechanisms of this type, hydraulic oil is applied to the splines 7a of the coupling shaft 7 via the line 18 and, as can be seen from FIG. 2, the region at which the hydraulic oil drains is sealed off from the exterior by means of a profiled gasket 19 with a Z-shaped cross-section. The inner 19a and outer 19b ring of this profiled gasket lie firmly against the coupling shaft 7 and the input shaft 8, whilst the relative movements of the coupling shaft 7 are absorbed by the obliquely extending link 19c between the rings 19a and 19b. By contrast, in order to prevent mating rust in the coupling member 4, which cannot be lubricated for practical reasons, the member is made from synthetic material.

Figure 3:
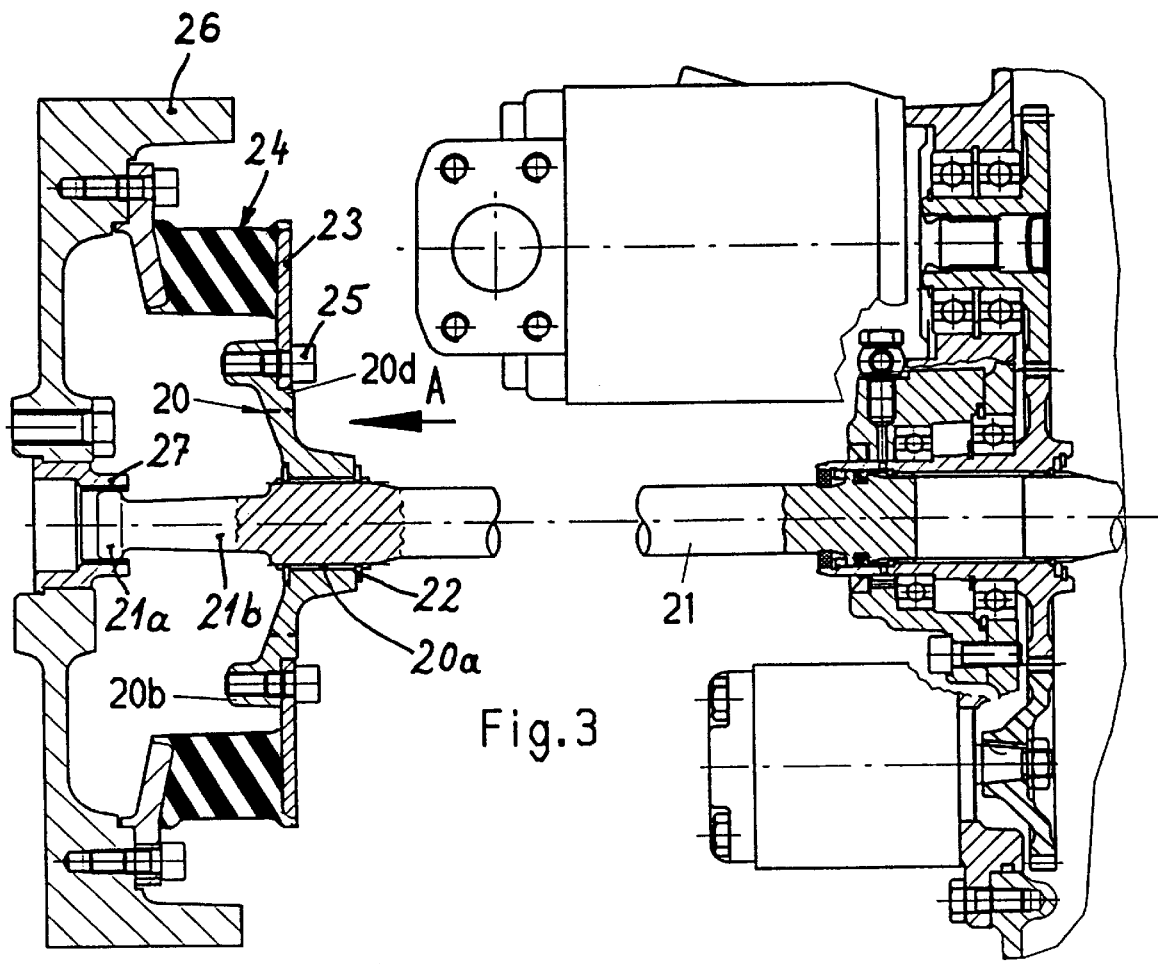
FIG. 3 is a side cross-sectional view of a second embodiment of the invention.

The transmission coupling assembly of FIG. 3 differs from the one described above essentially only by dint of the design of the boss 20 and the bearing of the shaft 21 on the internal combustion engine side.

Figure 4:
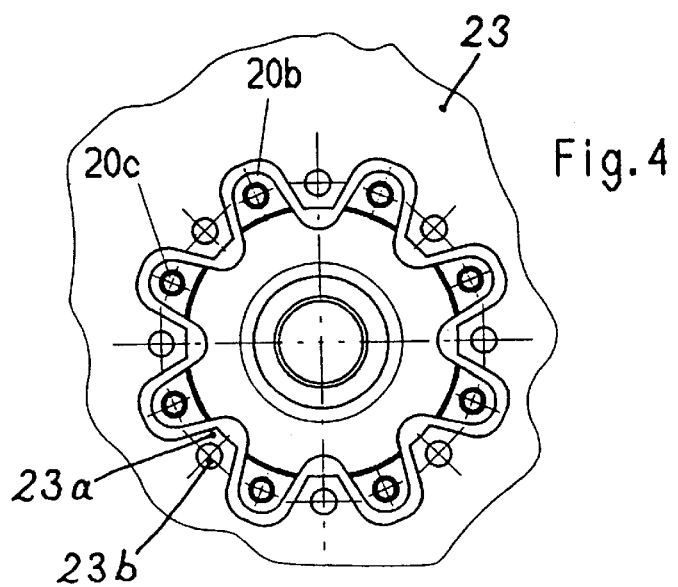
FIG. 4 is a partial view in the direction of the arrow A of FIG. 3.

In this case, the boss 20 is arranged on a larger diameter portion of the coupling shaft at a distance greater than the length L from the drive-side. The boss 20 is made rotationally and axially fast to the shaft by means of splines 20a and retaining rings 22. At its outer peripheral edge, the boss 20 has a plurality of radial lugs 20b, which are separated from one another by intermediate spaces which are wider than the lugs. Arranged around a notional circle centred on the axis of the boss 20 are a number of threaded bores 20c, one in each lug 20b. The coupling member 23 of the torsional vibration damper 24 has in its inner peripheral region the same number of inwardly pointing lugs 23a each having a bore 23b, the bores 23b lying on the same notional circle as the threaded bores 20c. The width of the lugs 23a corresponds to that of the lugs 20b so that the relative position of the boss 20 to the coupling member 23 as illustrated in FIG. 4 is such that the boss 20 can be passed through the coupling member 23 for assembling or dismantling the transmission coupling unhindered.

In the operating position illustrated in FIG. 3, the boss 20 is centred against the coupling member 23 the boss having a shoulder 20d which engages the coupling member. The boss and coupling member are oriented in the direction of rotation such that the bores in the lugs 20b and in the lugs 23a align with one another. In this position, boss 20 and coupling 23 are joined to one another by means of bolts 25.

The shaft 21 is centrally guided (a function which cannot be assumed by the torsional vibration damper 23 in this case either) by means of a bearing bush 27, in which the rounded section end region 21 a of the shaft 21 is received, the diameter thereof being only slighted smaller than the boss seat. The shaft portion 21b between the boss and the end region 21a has a smaller diameter, which makes for simple assembly and dismantling of the shaft 21 since the end region can be slid further into the bearing bush 27 on assembly and disassembly.

What we claim is:

1. A coupling assembly adapted to connect an engine to a gear train comprising:
    a flywheel adapted to be connected to the engine;
    a torsional vibration damper connected to said flywheel;
    a coupling shaft connected to said torsional vibration damper for rotational movement therewith and for axial movement relative thereto throughout a predetermined axial distance;
    an input shaft connected to said coupling shaft for rotational movement therewith and for axial movement relative thereto, said input shaft axially overlapping said coupling shaft by an overlapping distance that is less than said predetermined axial distance, said input shaft adapted to be connected to the gear train.

2. The coupling assembly defined in claim 1 wherein said flywheel has a spigot extending therefrom, and wherein said torsional vibration damper is supported on said spigot.

3. The coupling assembly defined in claim 2 wherein said spigot includes a tapered region, and wherein said torsional vibration damper is supported on said tapered region.

4. The coupling assembly defined in claim 3 wherein said spigot includes a reduced diameter portion extending between said flywheel and said tapered region.

5. The coupling assembly defined in claim 4 wherein said reduced diameter portion has an axial length that is greater than said overlapping distance.

6. The coupling assembly defined in claim 1 wherein said torsional vibration damper includes a coupling member connected to said flywheel and a boss connected to said coupling shaft, said coupling member and said boss having respective splines formed thereon that cooperate to connect said coupling member to said boss for rotational movement therewith and for axial movement relative thereto.

7. The coupling assembly defined in claim 6 wherein said splines formed on said boss are curved.

8. The coupling assembly defined in claim 1 wherein said torsional vibration damper and said coupling shaft have respective splines formed thereon that cooperate to connect said coupling shaft to said torsional vibration damper for rotational movement therewith and for axial movement relative thereto.

9. The coupling assembly defined in claim 1 wherein said coupling shaft and said input shaft have respective splines formed thereon that cooperate to connect said coupling shaft to said input shaft for rotational movement therewith and for axial movement relative thereto.

10. The coupling assembly defined in claim 9 wherein said splines formed on said coupling shaft are curved.

11. The coupling assembly defined in claim 9 further including a seal extending between said coupling shaft and said input shaft.

12. The coupling assembly defined in claim 11 wherein said seal is an annular seal having a generally Z-shaped cross sectional shape.

13. The coupling assembly defined in claim 1 wherein said flywheel has a spigot extending therefrom and said torsional vibration damper includes a coupling member connected to said flywheel and a boss connected to said coupling shaft, said coupling member and said boss having respective splines formed thereon that cooperate to connect said coupling member to said boss for rotational movement therewith and for axial movement relative thereto, said boss being supported on said spigot.

14. The coupling assembly defined in claim 1 wherein said torsional vibration damper includes a resilient member connected to said flywheel and a coupling member connected to said coupling shaft.

15. The coupling assembly defined in claim 14 wherein said torsional vibration damper further includes a coupling member connected to said resilient member and a boss connected to said coupling shaft, said coupling member and said boss having respective splines formed thereon that cooperate to connect said coupling member to said boss for rotational movement therewith and for axial movement relative thereto.

* * * * *